(12) United States Patent
Lau

(10) Patent No.: US 6,633,998 B1
(45) Date of Patent: Oct. 14, 2003

(54) MULTIPLE COMMUNICATIONS PORT UNIT AND COMPUTER ARCHITECTURE

(75) Inventor: Pui Lun Lau, Farmington, CT (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/459,337

(22) Filed: Dec. 13, 1999

(51) Int. Cl.[7] ................................................. G06F 11/00
(52) U.S. Cl. ........................... 714/22; 714/14; 713/340
(58) Field of Search ....................... 714/14, 22; 713/340

(56) References Cited

U.S. PATENT DOCUMENTS

| | | | | |
|---|---|---|---|---|
| 5,155,842 A | * | 10/1992 | Rubin | 714/22 |
| 5,307,480 A | * | 4/1994 | Hwang | 714/22 |
| 5,845,150 A | * | 12/1998 | Henion | 307/64 |
| 6,018,810 A | * | 1/2000 | Olarig | 710/307 |
| 6,223,089 B1 | * | 4/2001 | Page | 700/9 |
| 6,351,824 B1 | * | 2/2002 | Singh | 714/23 |

OTHER PUBLICATIONS

Pico Electronics, DC–DC Converters, Jul. 1998.*
Pressman, Abraham I., *Switching Power Supply Design*, Chapter 4, pp. 105–107.

* cited by examiner

*Primary Examiner*—Robert Beausoliel
*Assistant Examiner*—Marc Duncan
(74) *Attorney, Agent, or Firm*—Hunton & Williams

(57) ABSTRACT

A multiple communications port unit for coupling plural peripheral devices to a computer. The multiple communications port unit includes a network port for being coupled to a supervisory computer, communications ports for being coupled to the peripheral devices, and a power supply unit suitable for using the substation battery at an electric distribution substation for input power. The power supply unit includes redundant power supplies, an input conditioning circuit, and a sensing and annunciation circuit for providing a warning of a power supply malfunction.

52 Claims, 4 Drawing Sheets

MULTIPLE COMMUNICATIONS PORT UNIT AND COMPUTER ARCHITECTURE

BACKGROUND OF THE INVENTION

The invention relates to networked intelligent electronic devices and more particularly to a multiple communications port unit for coupling plural intelligent electronic devices to a computer over a network connection.

Protective relays are commonly used to protect electrical power distribution systems. In a simple form, a protective relay can be an electromechanical contact relay having an energizing circuit coupled to the load on an electric power distribution line. When the load exceeds certain parameters, the relay is energized to operate a circuit breaker, or the like, coupled to the line to thereby isolate a portion of the electrical distribution system having the fault. The contacts of the relay can perform various functions such as tripping a circuit breaker, generating an alarm or providing a signal to another protective relay. For the most part, such simple relays only provide the contact operation as an output. They do not provide an indication of the conditions which produced activity in the output contacts.

For instance, the principal of operation of a distance measuring relay is that the distance of a fault can be determined by a comparison of the complex impedance of the line derived from the current and voltage at the relay to a reach characteristic. If this comparison indicates that there is a fault within the protection zone of the relay, a trip contact is actuated. However, simple protective relays do not provide as an output any indication of where the fault is located or what the impedance was, or even what the current and voltage were which caused the trip. Similarly, a simple overcurrent relay trips in response to detection of a line current which exceeds a set point value, but it does not provide a quantitative indication of the magnitude of current which caused the trip.

Accordingly, "intelligent" protective relays have been developed having microprocessors capable of evaluating complex impedance or other variables to protect the electrical distribution system by isolating faults and capable of transmitting diagnostic data and the like to other computers for evaluation and display purposes. Typically, substations in an electric power system have many intelligent protective relays and other intelligent electronic devices (IED). The phrase intelligent electronic device, as used herein, refers to any distributed device having a microprocessor and being capable of carrying out control functions. Intelligent relays can be programmed to perform various protection functions. For instance, digital distance relays and overcurrent relays are in use. These relays are capable of providing a great deal of information. For instance, the location of the fault, and the current and voltage at the fault are available as outputs of a microcomputer controlled intelligent distance relay. Similarly, the current information is available from an intelligent overcurrent relay. This information generally is transmitted to a remote computer over separate RS-232 or RS 485 channels, i.e., serial channels, for each relay.

Accordingly, multiple serial port units have been developed. Such units include multiple serial ports, 8 or 16 for example, and an Ethernet port. The Ethernet port is coupled to a remote computer using standard Ethernet cable, for example an unshielded twisted pair (UTP), and protocols. The serial ports are each connected to an intelligent protective relay or other intelligent electronic device. The expansion unit uses known hardware and software to map the serial ports over the Ethernet connection to appear as local serial ports to the computer. Accordingly plural intelligent protective relays can be coupled to a computer over a great distance by a single Ethernet cable.

However, known multiple serial port units are powered by 120V/240 Vac or low voltage dc, e.g. 5V, 12V, 24V, or 48 Vdc. These voltages are not readily available in electrical distribution substation environments. In particular, electrical power at a substation is provided by the "substation battery" which is generally an 88–300 Vdc power supply. Therefore, various supplemental power transformers and converters must be used to convert the electric power available from the substation battery to electric power useable by multiple serial port units. Such supplemental transformers and converters introduce additional sources of failure in harsh substation environments. Further, the harsh substation environment often causes power supply failure. Also, electrical Ethernet links are susceptible to error in a high EMF area such as substations. For these reasons, it has been difficult to apply multiple serial port units in substation environments in a reliable manner.

BRIEF SUMMARY OF THE INVENTION

A first aspect of the invention is a multiple communications port unit comprising plural communications ports adapted to be coupled to peripheral devices, a network port adapted to communicate with a computer over a network link, and a power supply unit coupled to the communications ports and to the network port and having an input voltage of greater than or equal to 88 Vdc.

A second aspect of the invention is a multiple communications port unit comprising plural communications ports adapted to be coupled to intelligent electronic devices, a fiber optic network port adapted to communicate with a computer over a network link, a power supply unit coupled to the communications ports and to the network port and having an input voltage of greater than or equal to 88 Vdc. The power supply unit includes two power supplies configured to operate in a redundant manner.

A third aspect of the invention is a computer architecture comprising a computer, plural peripheral devices, and a multiple port communications unit having plural communications ports coupled to the peripheral devices, a fiber optic network port coupled to the computer over a network link, and a power supply unit coupled to the communications ports and to the network port and having an input voltage of greater than or equal to 88 Vdc. The power supply unit includes two power supplies configured to operate in a redundant manner.

A fourth aspect of the invention is a multiple communications port unit comprising communication means for coupling the port unit to peripheral devices, network means for communicating with a computer over a network link and power supply means for providing power to the communication means and the network means. The power supply means has an input voltage of greater than or equal to 88 Vdc.

BRIEF DESCRIPTION OF THE DRAWINGS

The invention is described through a preferred embodiment and the attached drawing in which.

DETAILED DESCRIPTION OF THE INVENTION

Figure 1:
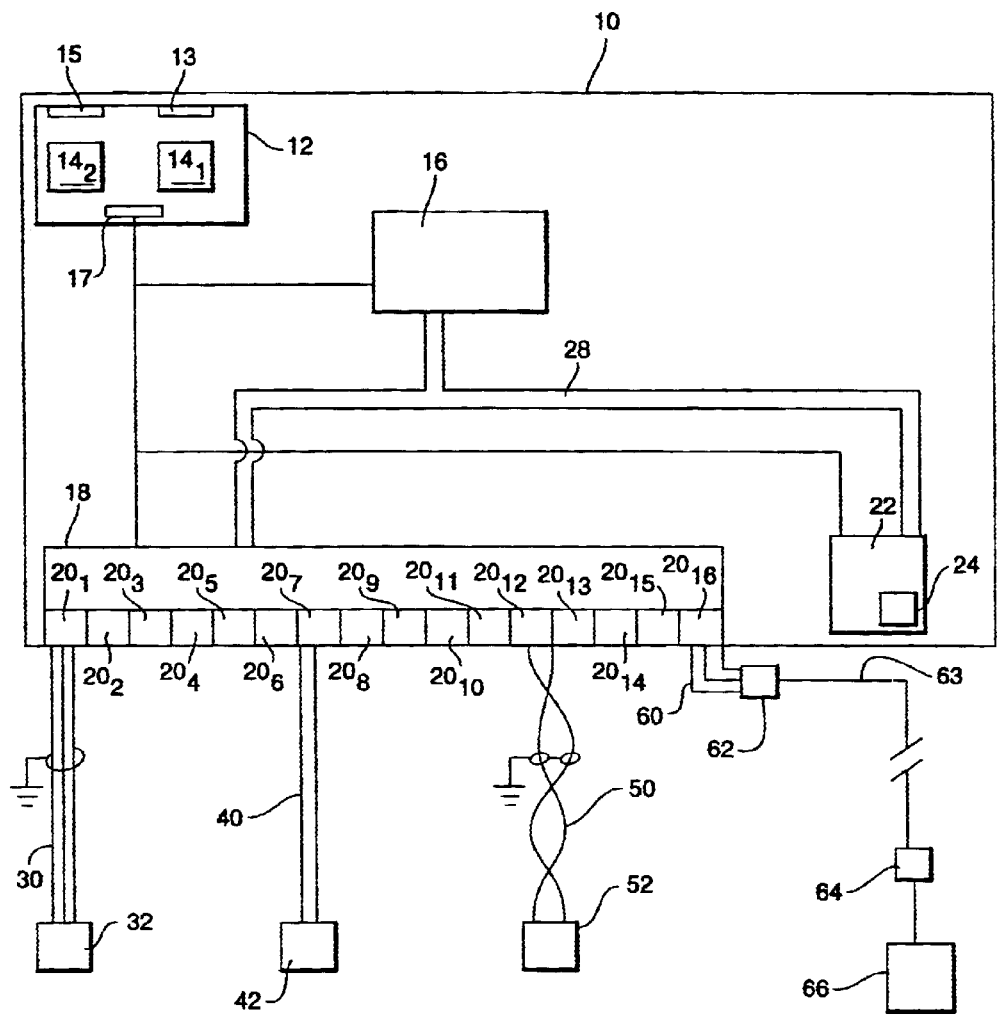
FIG. 1 is a block diagram of a multiple communication port unit of the preferred embodiment of the invention.

FIG. 1 is a block diagram of a preferred embodiment of the invention. Multiple communications port unit 10 includes power supply unit 12 having power supplies $14_1$ and $14_2$ configured in parallel to operate in a redundant manner. If one of power supplies $14_1$ and $14_2$ fails, the other can function, at least temporarily, as the sole power supply for multiple communications port unit 10. Power supply unit 12 also includes sensing and annunciation circuit 13 having a set of output relay contacts and may include any other indicating mechanism that is operative to indicate a failure of any of the output voltages (e.g. $^+$5V, $^+$12V, $^-$12V) of one of power supplies $14_1$ and $14_2$. Further, power supply unit 12 includes input conditioning circuit 15 and output conditioning circuit 17. Power supply unit 12 is coupled to other components discussed below in an appropriate manner to provide electrical power to the components at the desired voltage and current levels. However, for simplicity of illustration, only a schematic connection is illustrated in FIG. 1. Power supplies $14_1$ and $14_2$ of the preferred embodiment are coupled to one another in parallel. However, power supplies $14_1$ and $14_2$ can be configured in any manner to operate redundantly, i.e. in a manner in which failure of one power supply will cause the other power supply to provide power to remaining elements. For example, a current or voltage sensing device can be coupled to the power supplies and an electronic switch or the like can be operated to switch connections from one power supply to the other power supply in the event that the sensing device senses failure of a power supply. Power supply unit 12 is described in greater detail below.

Multiple communications port unit 10 also includes controller 16, communications port module 18, and network module 20. Controller 16 includes memory and any necessary logic circuits to accomplish the functions described below. The memory can be of any type including flash memory and EPROM. Controller 16 serves to map communications ports in the manner described below and to store and modify TCP/IP addresses and other data, such as configuration data, required for communications over a network. Controller 16 can be programmed using known programming languages and methods to accomplish the desired functions.

Communications port module 18 includes interface circuitry and 16 physical communications ports $20_1$–$20_{16}$, such as RS232, RS485, or fiber optic serial ports. Ports $20_1$–$20_{16}$, include an appropriate physical connector, such as a 9-pin D-type connector (DB-9) or a 25 pin D-type connector (DB-25) connectors in the case of RS232 ports, 2 and 4 wire terminal blocks in the case of RS485, and SMA or ST connectors in the case of fiber optic serial ports. Alternatively, all or some of ports $20_1$–$20_{16}$ can be Universal Serial Bus (USB) ports. Each of ports $20_1$–$20_{16}$ can be of the same type. Alternatively, $20_1$–$20_{16}$ can be of any combination of different types of ports, RS232, RS485 or fiberoptic, depending on the type of intelligent electronic devices to be coupled to multiple port communications unit 10.

FIG. 1 illustrates examples of the types of ports and the corresponding connection to an intelligent electronic device. Port $20_1$ is an RS232 port and is coupled by 3 wire copper cable 30 to intelligent electronic device 32. Port $20_7$ is a fiber optic RS232 port and is coupled by a two optical fibers 40 to intelligent electronic device 42. Port $20_{12}$ is an RS485 port and is coupled by a twisted pair copper cable 50 to intelligent electronic device 52. Port $20_{16}$ is an RS232 port and is coupled to intelligent electronic device 66 by modem 62, phone line 63 (POTS), and modem 64. Of course, communications port module 18 can include buffer memory, isolating circuits, signal conditioning circuits, and any other known hardware or software to accomplish the disclosed functions. Also, known protocol converters can be coupled to any of ports $20_1$–$20_{16}$ to provide added flexibility.

Network module 22 includes network communications port 24, which is a fiber optic Ethernet port in the preferred embodiment. However, network communications port 24 can be a 10 base T or 10 base 2 port, or the like. Network communications port 24 can include an ST connector for fiber optic Ethernet communications over optical fibers. Of course, network module 22 can include buffer memory, isolating circuits, signal conditioning circuits, and any other known hardware or software to accomplish the disclosed functions. Network module 22, communications module 18, and processor 16 are communicatively coupled via data bus 28 which can be of any appropriate type, such as an Industry Standard Architecture (ISA), VESA Local Bus (VLB) or Peripheral Controller Interface (PCI) bus. Communications port module 18, network port module 20, data bus 28, and controller 16 can be a standard multiple port unit, such as that sold by DIGI International under the trade name Digi-Port Server.

Figure 2:
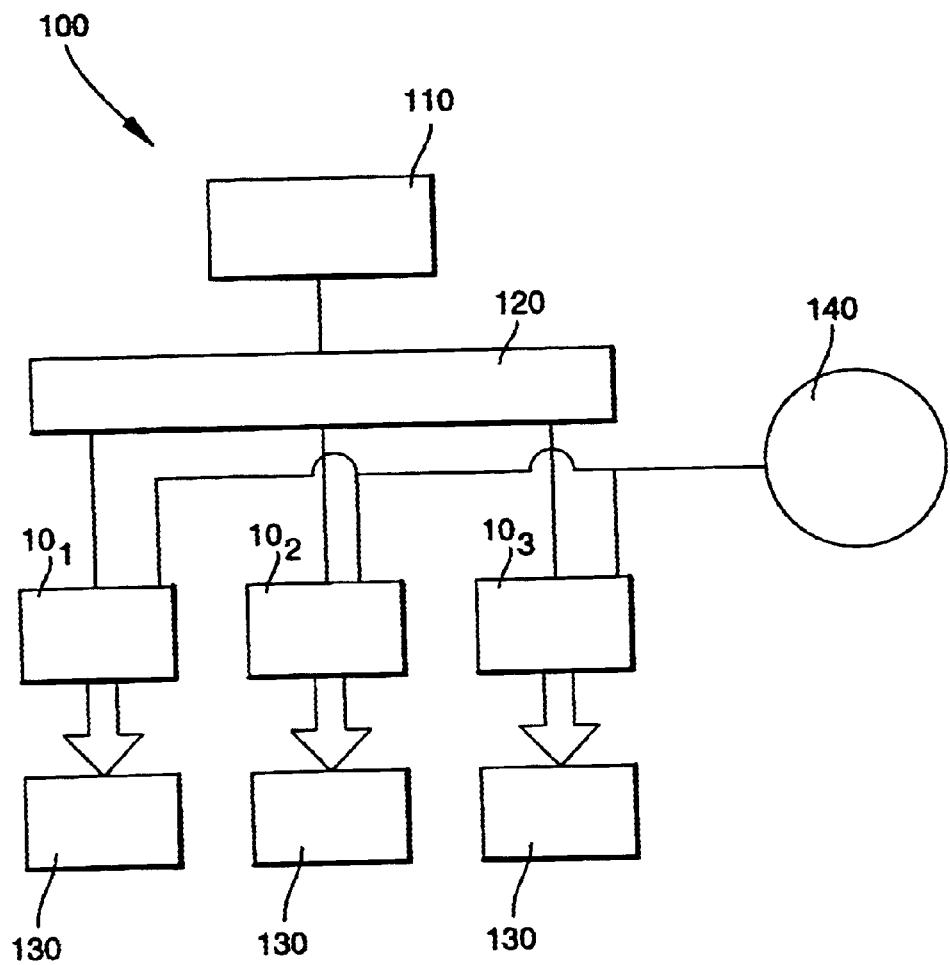
FIG. 2 is a block diagram of a preferred embodiment of a computer architecture using the multiple port unit of FIG. 1.

FIG. 2 illustrates a computer system architecture using the preferred embodiment. Architecture 100 includes computer 110 (a personal computer, server, minicomputer, programmable logic controller, or the like), fiber optic Ethernet hub 120, three multiple communication port units $10_1$, $10_2$, and $10_3$, which are similar to multiple communication port unit 10 described above, and peripheral device groups 130 which can each comprise plural intelligent protective relays or other intelligent electronic devices.

Computer 110 and multiple communication port units $10_1$–$10_3$, are coupled to hub 120 by appropriate cabling, fiber optic strands in the preferred embodiment, and communicate with one another using standard Ethernet protocols. Peripheral device groups 130 are coupled to communication ports of respective multiple communication port units $10_1$–$10_3$ by the appropriate cabling as described above with reference to FIG. 1. The various connections are illustrated schematically as a single arrow in FIG. 2. Each of multiple communication port units 101–103 can be configured with an IP address and each communication port can be mapped as a local port in computer 110 in a known manner. Of course, computer 110 has an Ethernet interface, such as a fiber optic Ethernet card. Also, note that substation battery 140 is coupled directly to each of multiple communication ports units $10_1$, $10_2$, and $10_3$.

Figure 3:
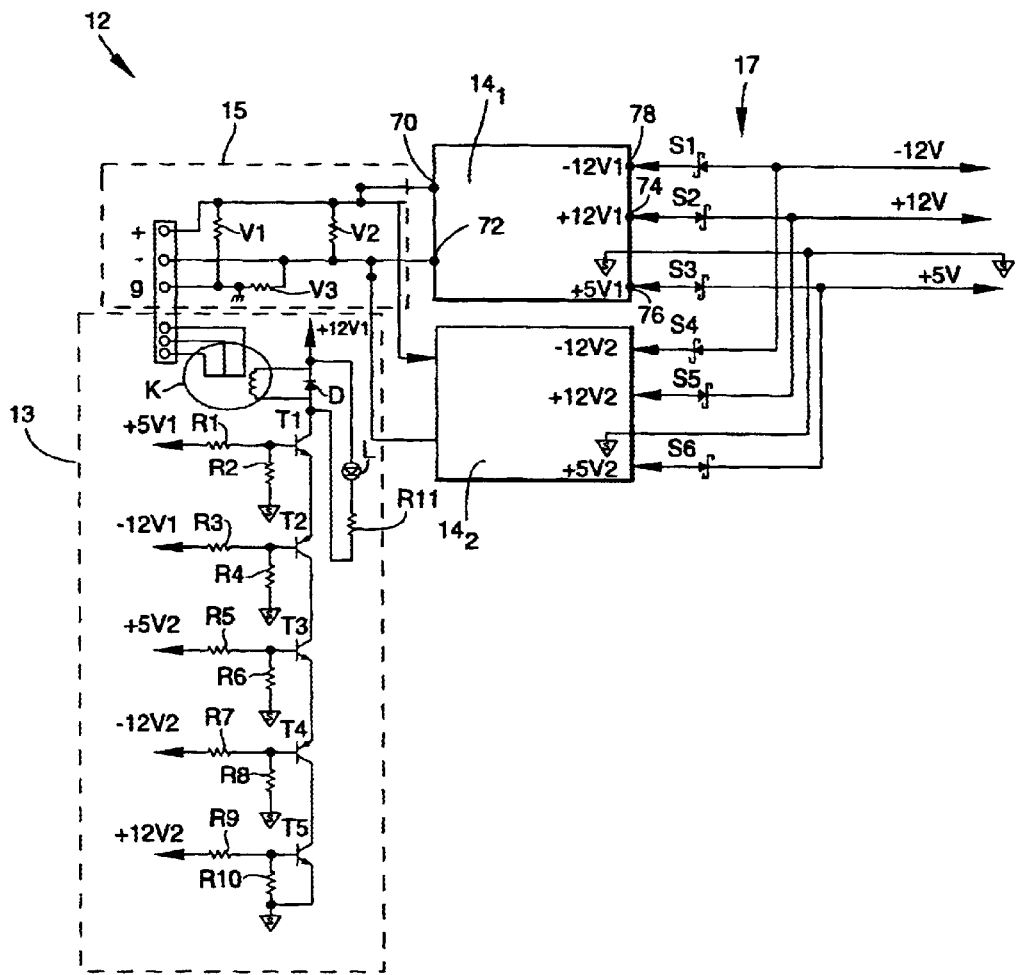
FIG. 3 is a schematic diagram of the power supply unit of the multiple port unit of FIG. 1.

FIG. 3 illustrates power supply unit 12 of multiple communication port unit 10 in detail. Input conditioning circuit 15 includes a positive terminal (+) for positive voltage input from substation battery 140, a negative terminal (−) for negative voltage input from substation battery 140, and a ground terminal (g) to be attached to ground. Varistors V1, V2 and V3 can be utilized to suppress noise. Specifically, varistor V1 is connected between the positive and ground terminals, varistor V2 is coupled between the positive and negative terminals, and varistor V3 is coupled between the negative and ground terminals. Varistors are essentially resistors having a resistance value that varies inversely with the voltage drop across the varistor. Varistors V1, V2, and V3 can be metal oxide varistors (MOV) or any other type of varistor. The positive and negative terminals of input conditioning circuit 15 are connected to corresponding input terminals of power supplies $14_1$ and $14_2$ as illustrated. Input conditioning circuit 15 can include any appropriate components for interfacing power supplies $14_1$ and $14_2$ to substation battery 140 and does not necessarily require varistors. In a low noise environment, input conditioning circuit 15 can be omitted.

Output conditioning circuit 17 includes rectifiers S1–S6 respectively in output lines of each of power supplies $14_1$ and $14_2$. These rectifiers connect power supplies $14_1$ and $14_2$ in a redundant mode. Note that each power supply $14_1$ and $14_2$ has a positive 12 Vdc output, a negative 12 Vdc output, a positive 5 Vdc output, and a ground as illustrated. Power supplies $14_1$ and $14_2$ can be of any known type. For example, power supplies sold under General Electric part no. 0246A9803P0014 or Skynet America part no. SNP-AS41. Power to the internal components of multiple communications port unit 10 can be supplied by either (or both) of power supplies $14_1$ and $14_2$.

Sensing and annunciation circuit 13 monitors the output voltages of power supplies $14_1$ and $14_2$ and changes the status of relay contacts and a visual indicator in the event that any one or more of the output voltages is not present at the proper value and polarity. A series connection of a coil of relay K and transistors T1–T5 is coupled between the positive 12 Vdc output of power supply $14_1$ and ground. The gates of transistors T1–T5 are respectively coupled to the positive 5 Vdc output of power supply $14_1$, the negative 12 Vdc output of power supply $14_1$, the positive 5 Vdc output of power supply $14_2$, the negative 12 Vdc output of power supply $14_2$, and the positive 12 Vdc output of power supply $14_2$ as illustrated. Diode D and a series connection of LED L and current limiting resistor R11 are connected in parallel with the coil of relay K. Accordingly, when all voltages at the outputs of power supplies $14_1$ and $14_2$ have the proper value and polarity, transistors T1–T5 are all in the on state and current flows from the positive 12 Vdc output of power supply $14_1$ to ground through the coil of relay K and LED L.

In such a state, the on state of LED L and the contact status of relay K indicate that power supplies $14_1$ and $14_2$ are operating properly. However, if the positive 12 Vdc output of power supply $14_1$ fails, there will not be any current flow through LED L and the coil of relay K and thus LED L will not be on and the contact status of relay K will change. Similarly, if the proper voltage and polarity is not present at the gate of any of one or more of transistors T1–T5, current will not flow through LED L and the coil of relay K and thus LED L will not be on and the contact status of relay K will change. The absence of light from LED L provides a visual indication that power supply 12 is not functioning properly. Also, the contacts of relay K can be used to sound an alarm, as an input to a computer controller, to provide a remote pilot light indication, or the like. Since power supplies $14_1$ and $14_2$ are redundant with respect to one another, failure of any one power supply does not affect the operation of multiple port unit 10. Therefore, sensing and annunciation circuit 17 provides a warning of a power supply failure prior to failure of multiple port unit 10. The ratings and gate voltages of transistors T1–T5, and the specifications of other components can be selected to provide the functionality described above based on particulars of the system components. For example, resistors R1, R3, R5, R7, and R9 can be 1k ohm, ¼W, 1% MTL resistors (such as those specified by GE part number 0246A9134P1001 and resistors R2, R4, R6, R8, and R10 can be 10k ohm (such as those specified by GE part number 0246A9134P1002) resistors.

Figure 4:
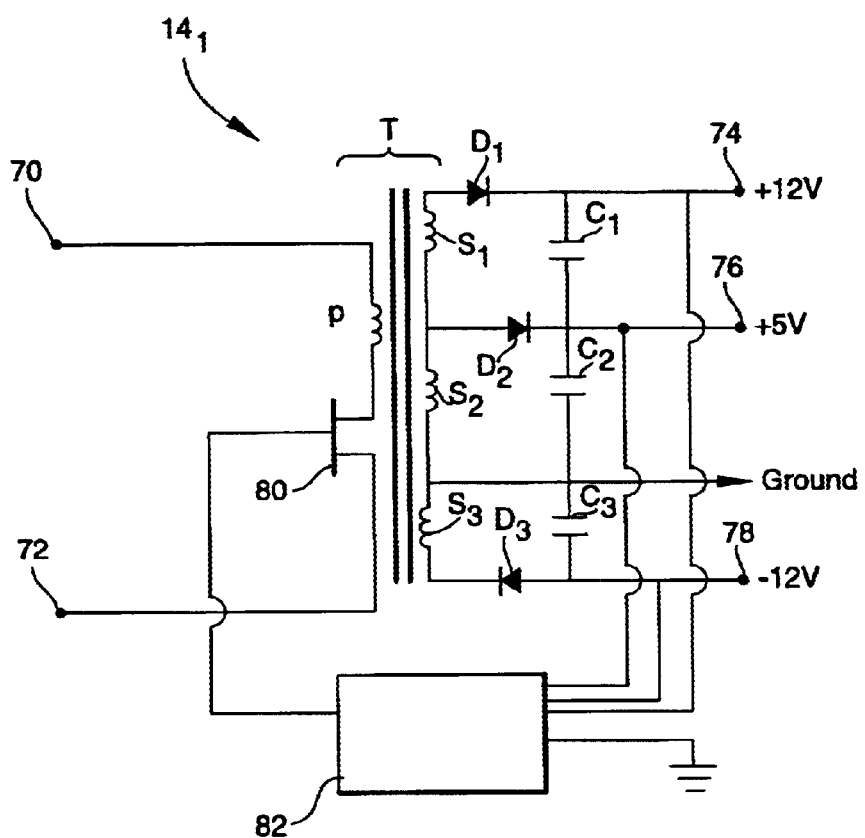
FIG. 4 is a schematic diagram of a power supply of the preferred embodiment.

FIG. 4 illustrates power supply $14_1$ in detail. Power supply $14_2$ is similar and thus is not discussed in greater detail herein. Power supply $14_1$ utilizes "flyback topology" in which energy is stored in a transformer while load current is supplied from an output capacitor when a power transistor is turned on. When the power transistor is off, stored transformer energy is transferred to the output as load current and to the capacitor to replenish change thereon. Substation battery 140 (FIG. 2) is coupled to input terminals 70 and 72 through input conditioning circuit 15 (FIG. 3). When power transistor 80 is in the on state, current flows through primary winding P of transformer T. Accordingly, current is induced in secondary windings $S_1$, $S_2$ and $S_3$ to store energy. Load current is supplied by voltage across capacitor $C_1$, $C_2$, and $C_3$. Controller 82 monitors the output voltage at terminals 74, 76, and 78 to selectively turn power transistor 80 on or off to maintain the desired output load voltage. When power transistor 80 is off stored transformer energy is used to provide load voltage and charge capacitors $C_1$, $C_2$, and $C_3$. The specifications of the various components can be adjusted to provide the desired output voltages based on anticipated input voltages. Such adjustment is well within the capability of one of ordinary skill in the art based on the disclosure herein.

In operation, an input connection of power supply unit 12 is coupled directly to the output of substation battery 140 which is standard equipment at electrical distribution substations. Because power supply unit 12 is configured to accept high voltage DC inputs anywhere in the range provided by substation batteries, there is no need for the use of transformers or external power supplies between multiple communications port unit 10 and substation battery 140. All elements of multiple communications port unit 10 are powered by power supply unit 12 with the single connection to substation battery 140. Peripheral devices in peripheral device groups 130 are controlled or monitored in a known manner by computer 110 over the fiber optic Ethernet connection. In the event that one of power supplies $14_1$ and $14_2$ fails, the other one can provide adequate power in a seamless manner. Also, in the event of such failure, contacts of relay K are operated to provide an alarm or other communication. The relay contacts can be coupled to a pilot light, a horn, computer 110, or to any other device for indicating that there has been a power supply failure. Also, the use of a fiber optic network connection reduces communication errors to noise generated by high EMF which is typical at substations.

Any type of peripheral device can be coupled to the communication ports. The communication ports can be of any type. There can be any number of communication ports in each multiple port unit and there can be any number of multiple port units in the architecture subject to addressing limitations. The network connection can use any type of cabling and protocols. The network and communication connections can be accomplished in a wireless manner using radio frequency infra-red or other technologies.

The invention has been described through a preferred embodiment. However, modifications can be made without departing from the scope of the invention as defined by the appended claims.

What is claimed is:

1. A multiple communications port unit, comprising:
   plural communications ports adapted to communicate with peripheral devices;

a network port adapted to communicate with a computer over a network link; and a power supply unit coupled to said communications ports and to said network port and having an input voltage of greater than or equal to 88 Vdc, said power supply unit comprising two power supplies configured to operate in a redundant manner, each of said power supplies comprising a flyback topology unit configured to provide a substantially constant dc voltage to said power supplies when the power supply unit has said input voltage.

2. A multiple communications port unit as recited in claim 1, wherein said flyback topology unit comprises a transformer having a primary winding and plural secondary winding, plural capacitors respectively coupled in parallel with said secondary windings, a switch coupled in series with said primary windings, and a voltage controller coupled to said capacitors and said switch.

3. A multiple communications port unit as recited in claim 1, wherein said power supplies comprising output terminals having plural levels and polarities of dc voltages and wherein said power supply unit further comprises a sensing and annunciation circuit configured to monitor each of said plural levels and polarities of voltages and to activate an indicator when any one or more of said plural levels and polarities of voltages are not at the proper level and polarity.

4. A multiple communications port unit as recited in claim 3, wherein said power supplies are coupled to one another in parallel.

5. A multiple communications port unit as recited in claim 3, wherein said indicator comprises a visual indicator and relay contacts.

6. A multiple communications port unit as recited in claim 3, wherein said sensing and annunciation circuit comprises a series connection of said indicator and plural transistors between one of said output terminals of said power supplies and ground, a gate electrode of each of said transistors being connected to respective others of said output terminals of said power supplies.

7. A multiple communications port unit as recited in claim 1, wherein said power supply unit comprises an input conditioning circuit having a positive input terminal to be coupled to the input voltage, a negative input terminal to be coupled to the input voltage, a ground terminal, a first varistor connected between said positive input terminal and said ground terminal, a second varistor connected between said positive input terminal and said negative input terminal, and a third varistor connected between said negative input terminal and said ground terminal.

8. A multiple communications port unit as recited in claim 1, wherein the input voltage of said power supply unit is in the range of 88 to 300 Vdc inclusive.

9. A multiple communications port unit as recited in claim 8, further comprising a controller configured to control communications between said network port and said communications ports.

10. A multiple communications port unit as recited in claim 9, further comprising a data bus coupled to said controller, said communications ports, and said network port.

11. A multiple communications port unit as recited in claim 10, wherein said communications ports are serial communications ports.

12. A multiple communications port unit as recited in claim 11, wherein said serial communications ports comprise at least one of an RS232 port, an RS485 port, and a fiber optics port.

13. A multiple communications port unit as recited in claim 1, wherein said power supplies are connected to one another in parallel.

14. A multiple communications port unit, comprising:

plural communications ports adapted to be coupled to intelligent electronic devices;

a fiber optic network port adapted to communicate with a computer over a network link;

a power supply unit coupled to said communications ports and to said network port and having an input voltage of greater than or equal to 88 Vdc, said power supply unit comprising two power supplies configured to operate in a redundant manner, each of said power supplies comprising a flyback topology unit configured to provide a substantially constant dc voltage to said power supplies when the power supply unit has said input voltage.

15. A multiple communications port unit as recited in claim 14, wherein said flyback topology unit comprises a transformer having a primary winding and plural secondary windings, plural capacitors respectively coupled in parallel with said secondary windings, a switch coupled in series with said primary winding, and a voltage controller coupled to said capacitors and said switch.

16. A multiple communications port unit as recited in claim 14, wherein said power supplies comprise output terminals having plural levels and polarities of dc voltages and wherein said power supply unit further comprises a sensing and annunciation circuit configured to monitor each of said plural levels and polarities of voltages and to activate and indicator when any one or more of said plural levels and polarities of voltages are not at the proper level and polarity.

17. A multiple communications port unit as recited in claim 16, wherein said power supplies are coupled to one another in parallel.

18. A multiple communications port unit as recited in claim 16, wherein said indicator comprises a visual indicator and relay contacts.

19. A multiple communications port unit as recited in claim 16, wherein said sensing and annunciation circuit comprises a series of said indicator and plural transistors between one of said output terminals of said power supplies and ground, a gate electrode of each said transistors being connected to respective others of said output terminals of said power supplies.

20. A multiple communications port unit as recited in claim 14, wherein said power supply unit comprises an input conditional circuit having a positive input terminal to be coupled to the input voltage, a negative input terminal to be coupled to the input voltage, a ground terminal, a first varistor connected between said positive input terminal and said ground terminal, a second varistor connected between said positive input terminal and said negative input terminal, and a third varistor connected between said negative input terminal and said ground terminal.

21. A multiple communications port unit as recited in claim 14, wherein the input voltage of said power supply unit is in the range of 88 to 300 Vdc inclusive.

22. A multiple communications port unit as recited in claim 21, further comprising a controller configured to control communications between said network port and said communications ports.

23. A multiple communications port unit as recited in claim 22, further comprising a data bus coupled to said controller, said communications ports, and said network port.

24. A multiple communications port unit as recited in claim 23, wherein said communications ports are serial communications ports.

25. A multiple communications port unit as recited in claim 24, wherein said serial communications ports comprise at least one of an RS232 port, an RS485 port, and a fiber optics port.

26. A multiple communications port unit as recited in claim 14, wherein said power supplies are connected to one another in parallel.

27. A computer architecture comprising:
a computer;
plural peripheral devices; and
a multiple port communications unit having plural communications ports coupled to said peripheral devices, a network port coupled to said computer over a network link, and a power supply unit coupled to said communications ports and to said network port and having an input voltage of greater than or equal to 88 Vdc, said power supply unit comprising two power supplies configured to operate in a redundant manner, each of said power supplies comprising a flyback topology unit configured to provide a substantially constant dc voltage to said power supplies when the power supply unit has said input voltage.

28. A multiple communications port unit as recited in claim 27, wherein said flyback topology unit comprises a transformer having a primary winding and plural secondary windings, plural capacitors respectively coupled in parallel with said secondary windings, a switch coupled in series with said primary winding and a voltage controller coupled to said capacitors and said switch.

29. A computer architecture as recited in claim 27, wherein said power supplies comprise output terminals having plural levels and polarities of dc voltages and wherein said power supply unit further comprises a sensing and annunciation circuit configured to monitor each of the plural levels and polarities of voltages and to annunciate the indicator when any one or more of the plural levels and polarities of voltages are not at the proper level and polarity.

30. A computer architecture as recited in claim 29, wherein said power supplies are coupled to one another in parallel.

31. A computer architecture as recited in claim 29, wherein said indicator comprises a visual indicator and relay contacts.

32. A computer architecture as recited in claim 29, wherein; said sensing and annunciation circuit comprises a series connection of said indicator and plural transistors between one of said output terminals of said power supplies and ground, a gate electrode of each of said transistors being connected to respective others of said output terminals of said power supplies.

33. A computer architecture as recited in claim 27, wherein said power supply unit comprises an input conditioning circuit having a positive input terminal to be coupled to the input voltage, a negative input terminal to be coupled to the input voltage, a ground terminal, a first varistor connected between said positive input terminal and said ground terminal, a second varistor connected between said positive input terminal and said negative input terminal, and a third varistor connected between said negative input terminal and said ground terminal.

34. A computer architecture as recited in claim 33, wherein the input voltage of said power supply unit is in the range of 88 to 300 Vdc inclusive.

35. A computer architecture as recited in claim 27, wherein said multiple communications port unit further comprises a controller configured to control communications between said network port and said communications ports.

36. A computer architecture as recited in claim 35, wherein said multiple communications port unit further comprises a data bus coupled to said controller, said communications ports, and said network port.

37. A computer architecture as recited in claim 36, wherein said communications ports are serial communications ports.

38. A computer architecture as recited in claim 37, wherein said serial communications ports comprise at least one of an RS232 port, and RS485 port, and a multi-mode fiber optics port.

39. A computer architecture as recited in claim 29, wherein said power supplies are connected to one another in parallel.

40. A multiple communications port unit, comprising:
communication means for communicating with peripheral devices;
network means for communicating with a computer;
power supply means for providing power to said communication means and said network means, said power supply means having an input voltage of greater than or equal to 88 Vdc, said power supply means comprising two power supplies configured to operate in a redundant manner, each of said power supplies comprising a flyback topology unit configured to provide a substantially constant dc voltage to said power supplies when the power supply means has said input voltage.

41. A multiple communications port unit as recited in claim 40, wherein said flyback topology unit comprises a transformer having a primary winding and plural secondary windings, plural capacitors respectively coupled in parallel with secondary windings, a switch coupled in series with said primary winding and a voltage controller coupled to said capacitors and said switch.

42. A multiple communications port unit as recited in claim 41, wherein said power supplies comprise output terminals having plural levels and polarities of dc voltages and wherein said power supply means further comprises sensing and annunciation means for monitoring each of said plural levels and polarities of voltages and for activating an indicator when any one or more of said plural levels and polarities of voltages are not at the proper level and polarity.

43. A multiple communications port unit as recited in claim 42, wherein said power supplies are coupled to one another in parallel.

44. A multiple communications port unit as recited in claim 43, wherein said indicator comprises a visual indicator and relay contacts.

45. A multiple communications port unit as recited in claim 44, wherein said sensing and annunciation means comprises a series connection of said indicator and plural transistors between one of said output terminals of said power supplies and ground, a gate electrode of each of said transistors being connected to respective others of said output terminals of said power supplies.

46. A multiple communications port unit as recited in claim 40, wherein said power supply means comprises input conditioning means having a positive input terminal to be coupled to the input voltage, a negative input terminal to be coupled to the input voltage, a ground terminal, a first varistor connected between said positive input terminal and said ground terminal, a second varistor connected between said positive input terminal and said negative input terminal, and a third varistor connected between said negative input terminal and said ground terminal.

47. A multiple communications port unit as recited in claim 40, wherein the input voltage of said power supply means is in the range of 88 to 300 Vdc inclusive.

48. A multiple communications port unit as recited in claim 47, further comprising controller means configured to control communications between said network means and said communication means.

49. A multiple communications port unit as recited in claim 48, further comprising a data bus coupled to said controller means, said communication means, and said network means.

50. A multiple communications port unit as recited in claim 49, wherein said communication means comprises serial communication ports.

51. A multiple communications port unit as recited in claim 50, wherein said serial communication ports comprise at least one of an RS232 port, an RS485 port, and a fiber optics port.

52. A multiple communications port unit as recited in claim 40, wherein said power supplies are connected to one another in parallel.

\* \* \* \* \*